United States Patent
Tsai

[19]

[11] Patent Number: 5,931,049
[45] Date of Patent: Aug. 3, 1999

[54] ADJUSTING DEVICE FOR A HANDLE BAR OF A BICYCLE

[76] Inventor: Chin-Sung Tsai, No. 2, Lane 371, Hwa Cheng Rd., Hsin Chuang City, Taipei Hsein, Taiwan

[21] Appl. No.: 09/050,047

[22] Filed: Mar. 30, 1998

[51] Int. Cl.$^6$ .................................................. B62K 21/22
[52] U.S. Cl. .......................................... 74/551.3; 74/551.6
[58] Field of Search ............................... 74/551.3, 551.4, 74/551.5, 551.6, 551.7; 403/96

[56] References Cited

U.S. PATENT DOCUMENTS

| | | | |
|---|---|---|---|
| 551,173 | 12/1895 | Ryan | 74/551.7 |
| 601,792 | 4/1898 | Gardner et al. | 74/551.4 |
| 5,273,302 | 12/1993 | Ureel | 74/551.3 X |
| 5,755,141 | 5/1998 | Chen | 74/551.3 |

*Primary Examiner*—John A. Jeffery
*Assistant Examiner*—Mary Ann Battista
*Attorney, Agent, or Firm*—Rosenberg, Klein & Bilker

[57] ABSTRACT

The adjusting device is securely connected to a front fork of the bicycle via a yoke having a body, a pair of symmetrically opposed wings integrally formed on the body and a pair of lugs respectively formed on one of the pair of the wings. With the assembly of the adjusting device and the yoke, a relative adjusting movement of the adjusting device to the yoke enables a user to comfortably ride on a bicycle. Furthermore, due to the handle being securely received within the adjusting device, adjusting the angle of the adjusting device will simultaneously adjust an angle of the handle bar to adapt to various lengths of arms of different users.

2 Claims, 7 Drawing Sheets

ADJUSTING DEVICE FOR A HANDLE BAR OF A BICYCLE

BACKGROUND OF THE INVENTION

1. Field of the Invention

The present invention relates to an adjusting device for a handle bar of a bicycle and more particularly to an adjusting device which is able to readily and easily facilitate adjusting of an angle of the handle bar of the bicycle due to the various lengths of arms of different users.

2. Description of Related Art

Referring to FIG. 7, a conventional handle bar stem 80 for a handle bar 90 of a bicycle is shown. It is to be noted that a first end of a stem 70 is securely disposed onto a front fork (not shown or numbered) of the bicycle and a second end thereof is securely connected to the handle bar stem 80. The handle bar 90 is securely received within the handle bar stem 80 via a plurality of screws 83. The handle bar stem 80 still has an upper cap 81 having a plurality of first holes (not numbered) and a base 82 detachably connected to the cap 81 and having a plurality of second holes (not shown and numbered) respectively corresponding to one of the plurality of first holes of the upper cap 81, such that the handle bar 90 is able to be securely received between the upper cap 81 and the base 82 of the handle bar stem 80 after the handle bar 90 is disposed therebetween. However, due to various lengths of arms of different users, the handle bar 90 needs to be adjusted to a specific and suitable angle. An adjusting process of the handle bar 90 starts from loosening the screws 83 so that the handle bar 90 is able to be adjusted to a suitable angle and when the angle adjusting of the handle bar 90 is accomplished, a user only needs to tighten the screws 83 to assure that the handle bar 90 is firmly received within the handle bar stem 80. While tightening the screws 83 with one hand, the user will have to use the other hand to hold the handle bar 90 in position, which not only consumes a great deal of effort, but also takes a lot of time to finish the process of adjustment of the handle bar 90. Meanwhile, when tightening the screws 83, it is not easy to be sure that all the screws 83 are evenly tightened in position from observing the appearance of the handle bar stem 80. Therefore, if the screws 83 are not properly tightened in position, the user will be very easily hurt by the slipping and/or sliding of the handle bar 90. Accordingly, the conventional handle bar stem 80 for a handle bar 90 of a bicycle is not practically satisfied by the present users.

The present invention provides an adjusting device for a handle bar of a bicycle to mitigate or obviate the above mentioned problems.

SUMMARY OF THE INVENTION

The main object of the present invention is to provide an adjusting device for a handle bar of a bicycle, which enables a user to readily and rapidly achieve the requirement of adjusting the angle of the handle bar.

Other objects, advantages and novel features of the invention will become more apparent from the following detailed description when taken in conjunction with the accompanying drawings.

DETAILED DESCRIPTION OF PREFERRED EMBODIMENT

Figure 1:
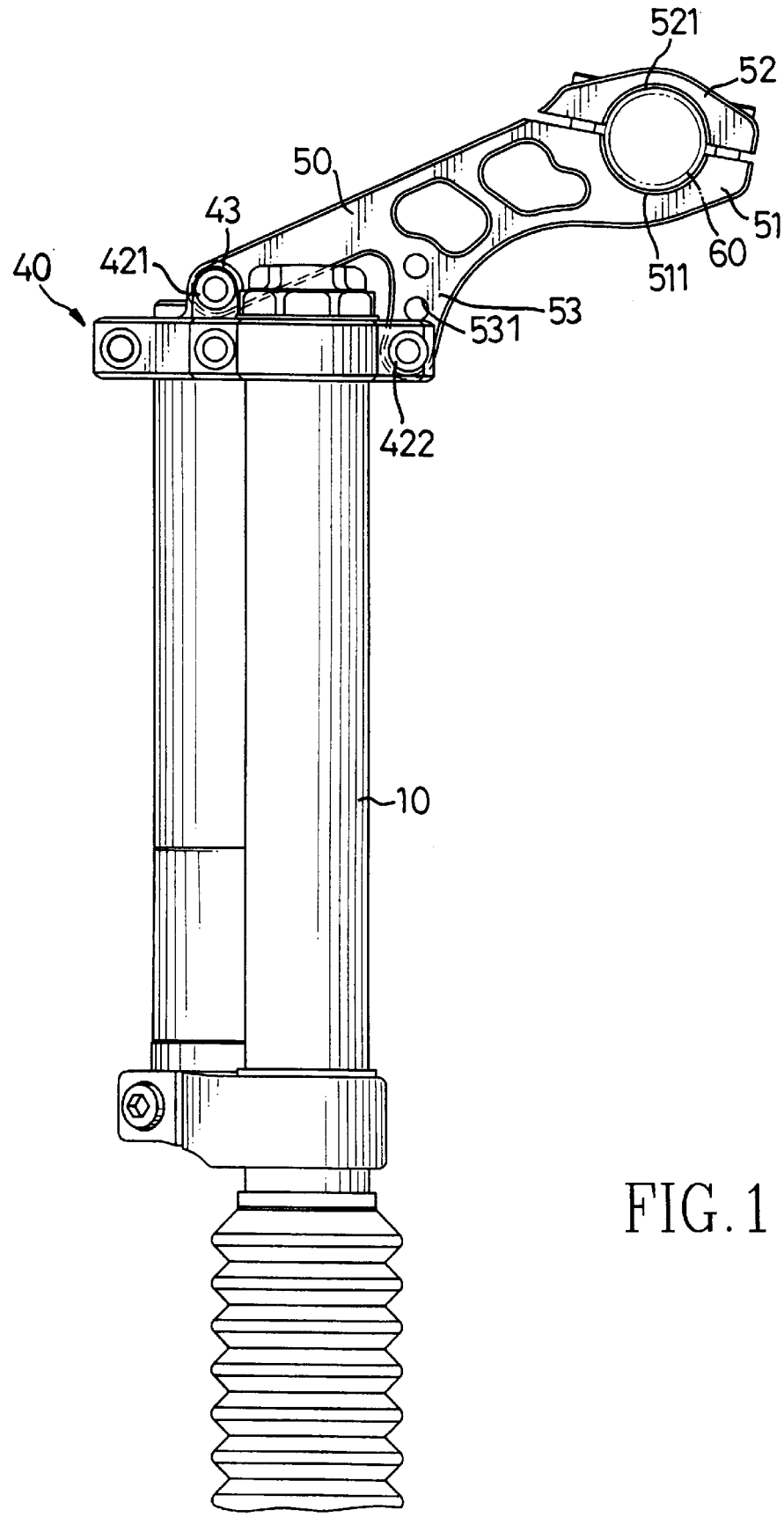
FIG. 1 is a side view of an adjusting device constructed in accordance with the present invention and in assembly with a stem via a yoke.
Figure 2:
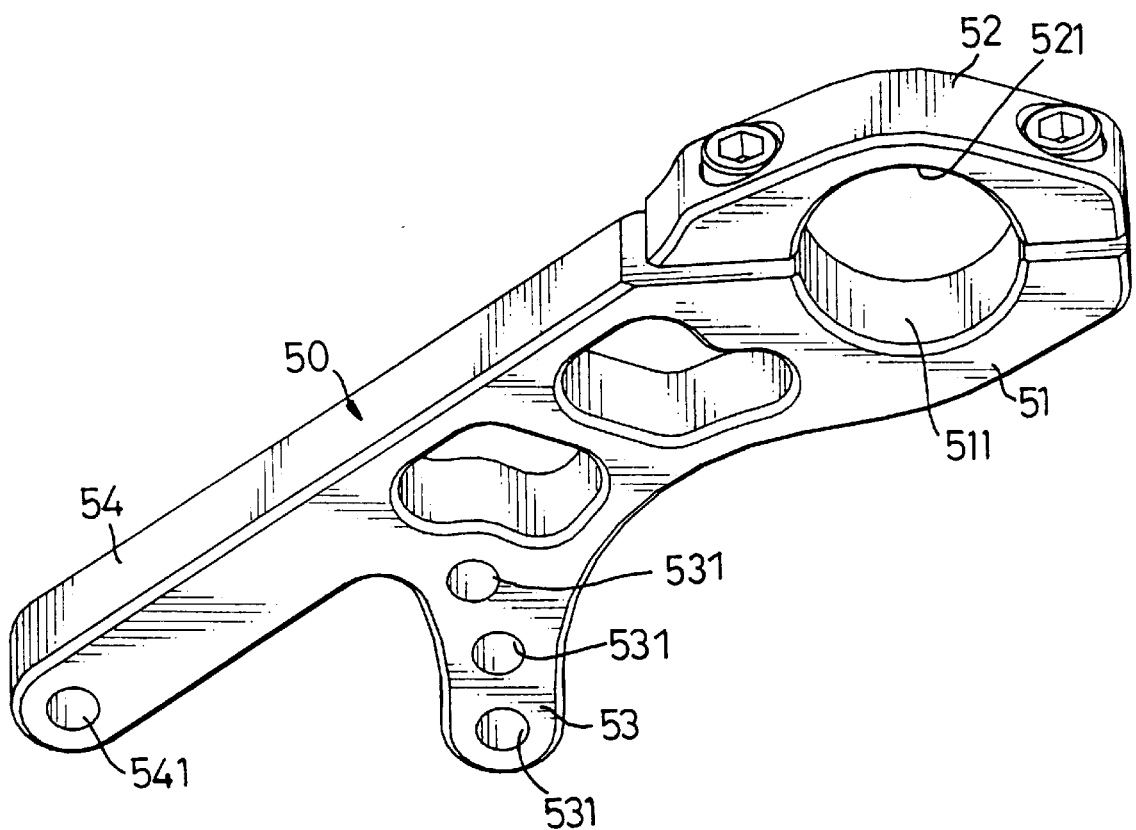
FIG. 2 is a perspective view of the adjusting device in accordance with the present invention.
Figure 3:
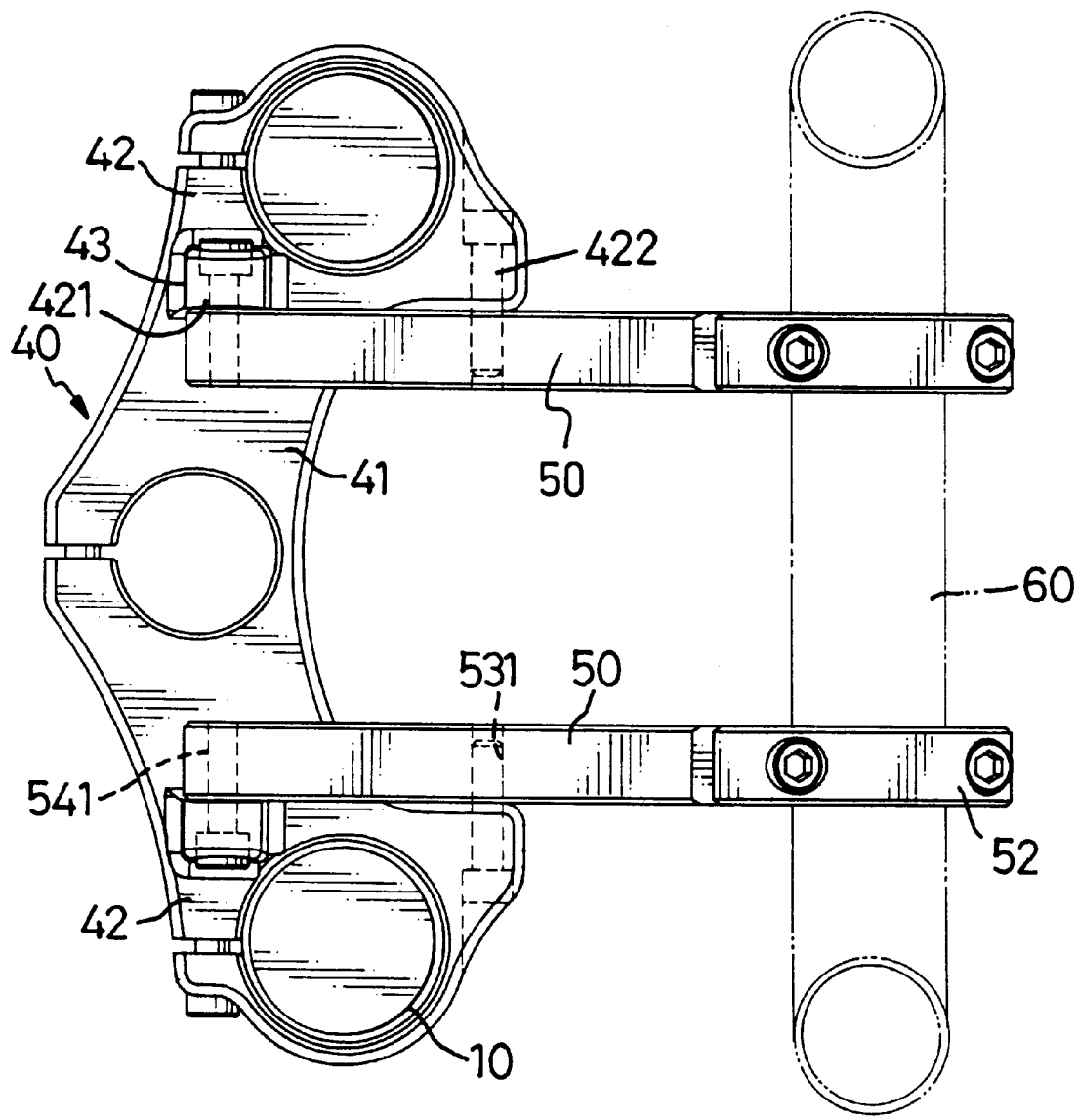
FIG. 3 is a top view showing an assembly of the adjusting device with the yoke.

Referring to FIG. 1 and FIG. 2, an adjusting device 50 for a handle bar of a bicycle (not shown) is shown. The adjusting device 50 is securely connected to a front fork 10 via a yoke 40. It is especially shown in FIGS. 1 and 3 that the yoke 40 has a body 41, a pair of symmetrically opposed wings 42 integrally formed on the body 41 and a pair of lugs 43 respectively formed on one of the pair of the wings 42. It is to be noted that since each one of the opposed wings 42 is identical in structure, only one of the wings 42 will be described in detail hereinafter. Furthermore, it is shown in FIG. 3 that a pair of adjusting devices 50 are provided to the bicycle. Because each one of the pair of the adjusting devices 50 is identical to each other, only one of the pair of the adjusting devices 50 is described in detail hereinafter.

The wing 42 has a first counterbored hole 421 and a second counterbored hole 422 defined therein. The adjusting device 50 has a connecting member 51 defining therein a first semi-circular recess 511 and a cap 52 detachably connected with the connecting member 51 and defining therein a second semi-circular recess 521. When the connecting member 51 and the cap 52 are combined, the first and second semi-circular recesses 511, 521 define a circular gap therein to securely receive a handle bar 60 (as shown in FIG. 3). The adjusting device 50 further has a first extension 53 having at least two first screw holes 531 (three are shown in this embodiment) defined therein and each of which alternatively corresponds to the second counterbored hole 422 of the wing 42, and a second extension 54 defining therein a second screw hole 541 corresponding to the first counterbored hole 421 of the wing 42.

Referring to FIG. 3, when the yoke 40 is assembled with the adjusting device 50 of the invention, a first connector (not numbered) is able to be respectively inserted into the first counterbored hole 421 of the yoke 40 and the second screw hole 541 of the second extension 54 of the adjusting device 50, and a second connector (not numbered) is able to be respectively inserted into the second counterbored hole 422 of the yoke 40 and one of the first through holes 531 of the first extension 53 of the adjusting device 50.

Figure 4:
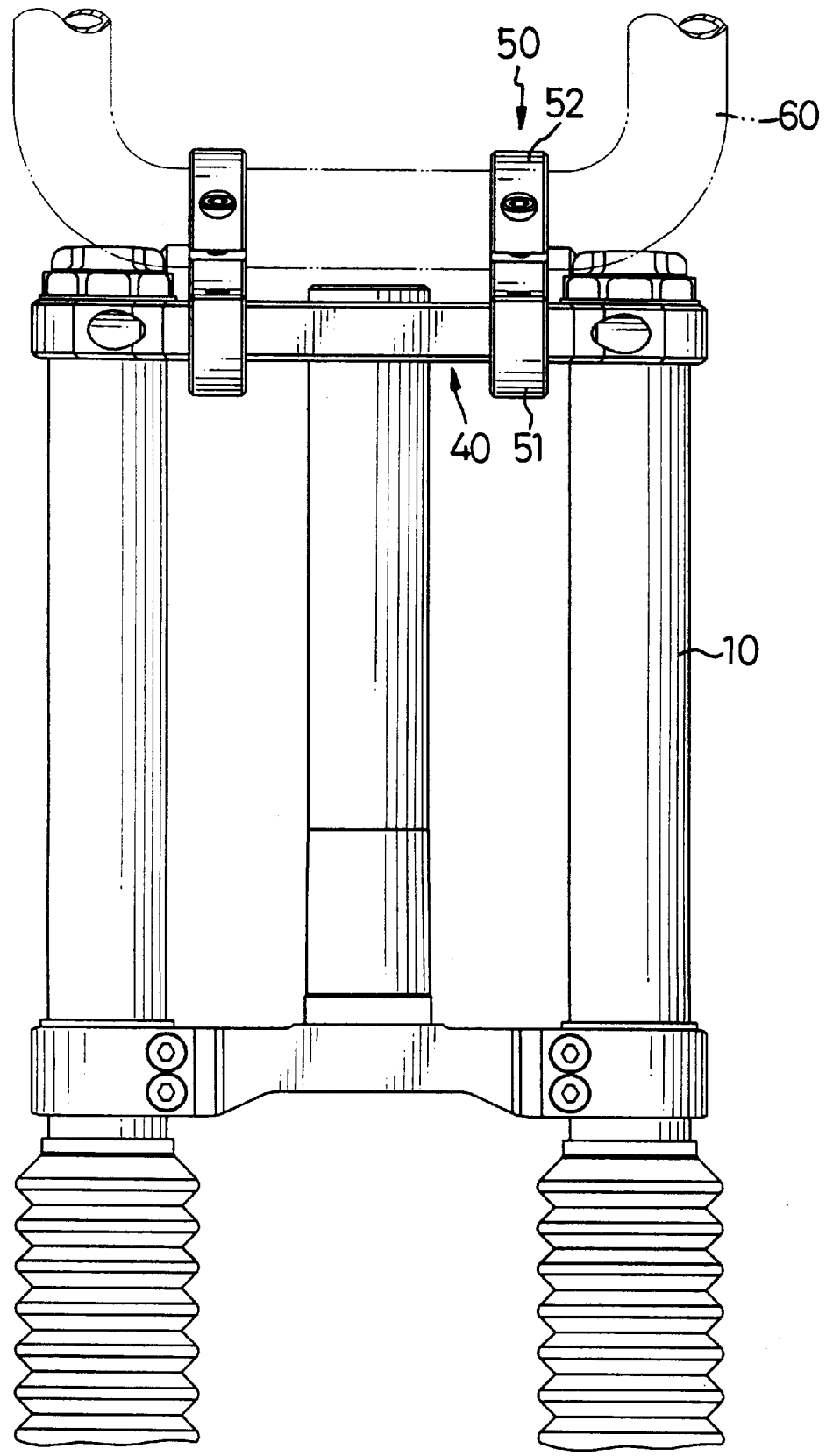
FIG. 4 is a rear view showing that the adjusting device of the invention is assembled with the stem via the yoke.
Figure 5:
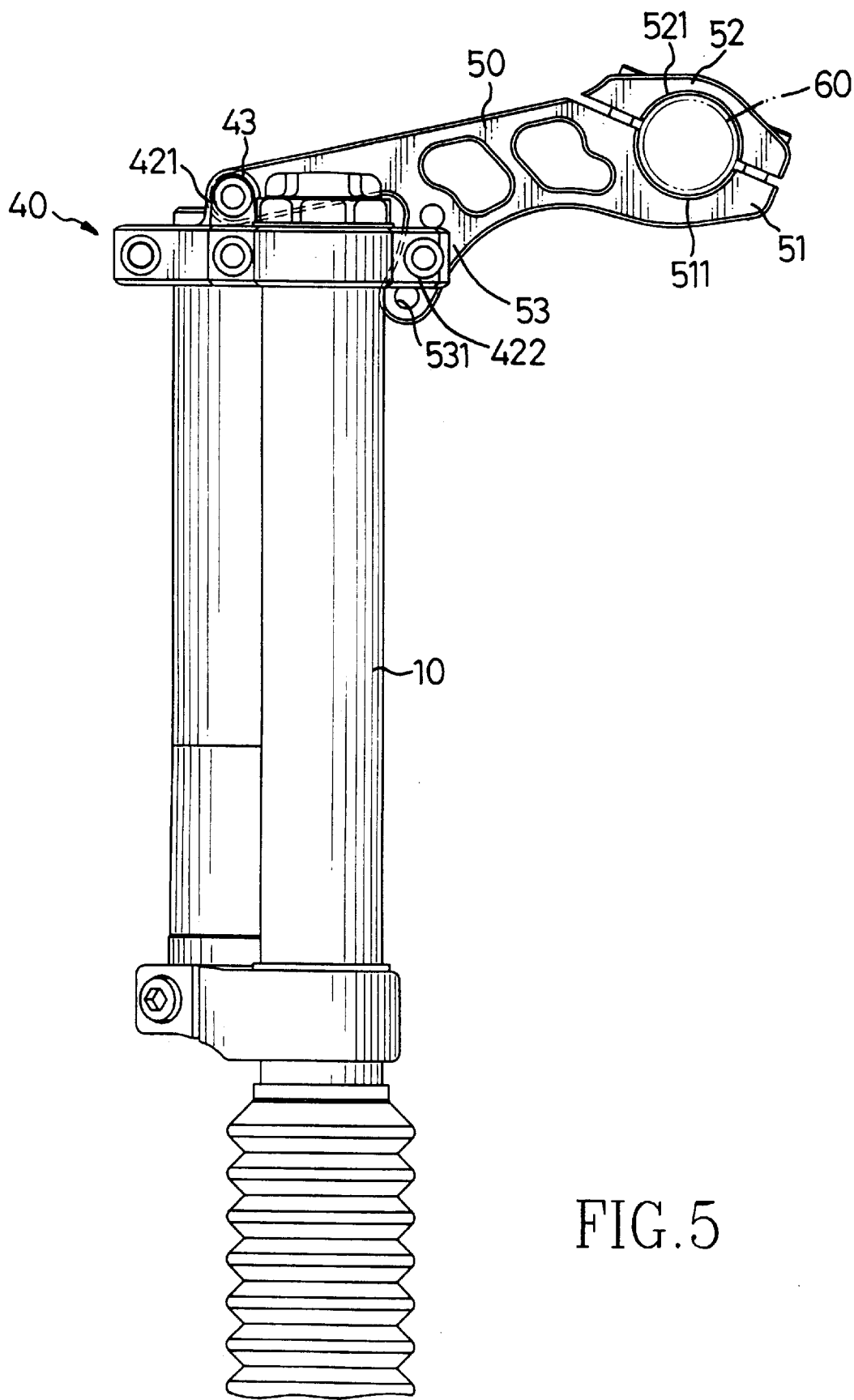
FIG. 5 is a schematic side view showing an adjusting process of the adjusting device.

After the yoke 40 and the adjusting device 50 of the invention are assembled, referring to FIGS. 4 and 5, a user is able to firstly loosen the first connector and then adjust an angle of the adjusting device 50 related to the yoke 40 by removing the second connector from the second counterbored hole 422 of the yoke 40 and one of the corresponding first screw hole 531 of the first extension 53 of the adjusting device 50. Due to the handle bar 60 being securely received within the circular gap defined by the connecting member 51 and the cap 52, adjusting the angle of the adjusting device 50 will simultaneously adjust an angle of the handle bar 60 to adapt to various lengths of arms of different users.

Figure 6:
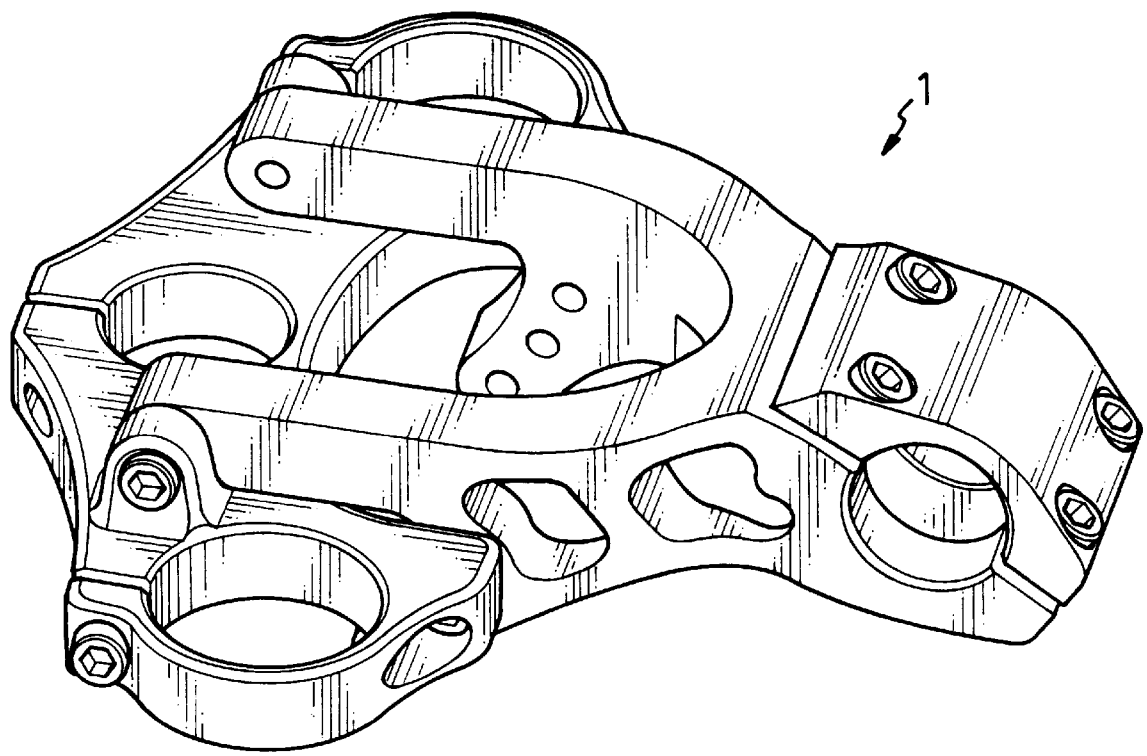
FIG. 6 is a perspective view of an alternative embodiment of the adjusting device of the invention.
Figure 7:
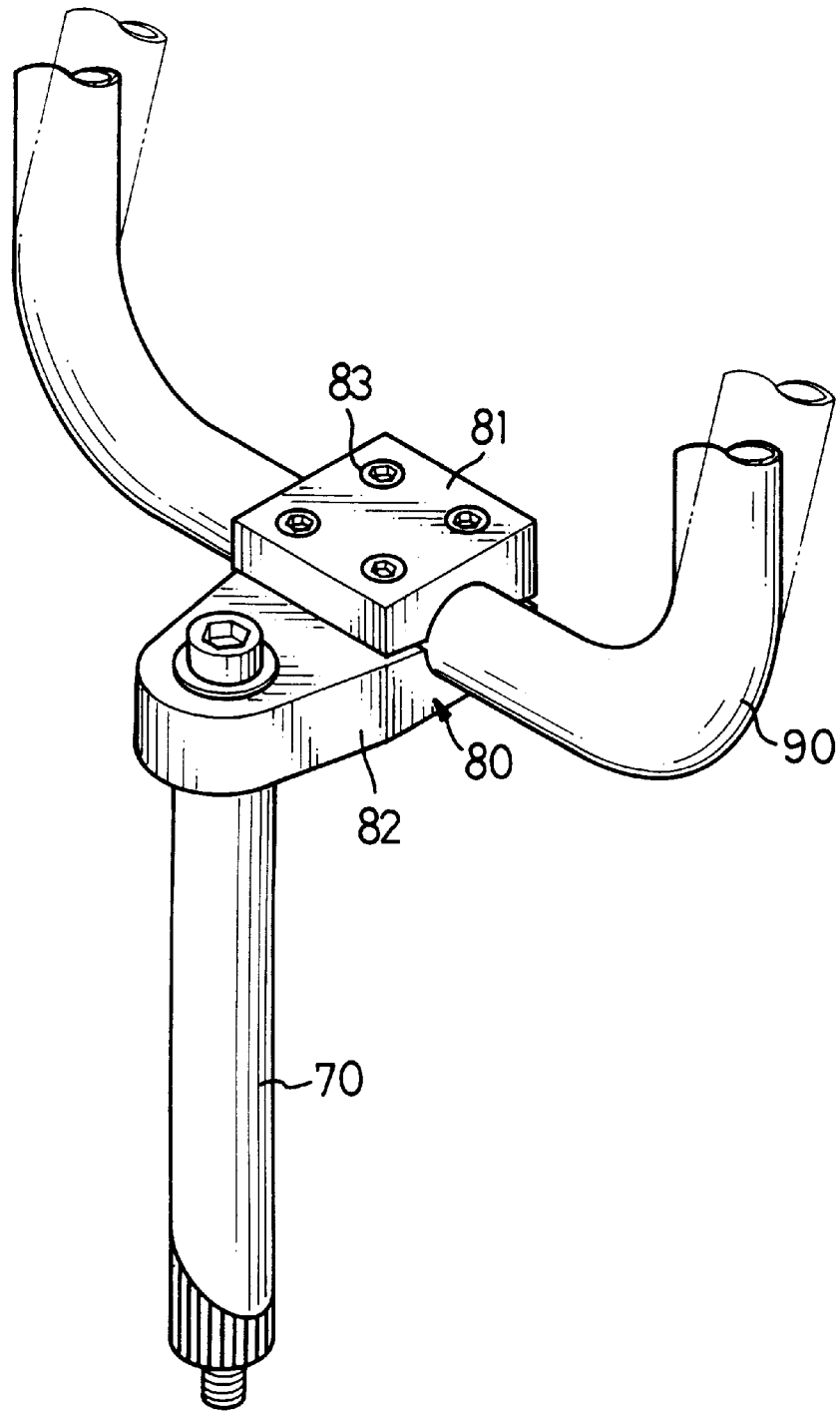
FIG. 7 is a perspective view showing a handle bar is assembled with a stem of a bicycle via a conventional handle bar stem.

It is to be noted that with the adjusting device 50 of the invention, a user is able to readily achieve the purpose of adjusting the angle of the handle bar 60 of the bicycle, such that different users will be able to have their respective angle of the handle bar 60 when riding on the bicycle. Referring to FIG. 6, an alternative embodiment of an adjusting device 1 of the present invention is shown. It is to be noted that the pair of adjusting devices 50 as shown in FIG. 3 are now combined into one piece, however, the function and the structure thereof are substantially the same, therefore, detailed description thereof is omitted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjusting device for a handle bar of a bicycle comprising:

a yoke having a pair of first holes and a pair of second holes; and a connecting member being adapted to receive the handle bar and securely connected with the yoke, the connecting member comprising:

a pair of first extensions each having a plurality of through holes, the through holes of each extension selectively corresponding to one of the first holes of the yoke respectively;

a pair of second extensions each having a through hole which corresponds to one of the pair of second holes of the yoke respectively;

a pair of first connectors each extending through the corresponding second hole of the yoke and the through hole of the second extension of the connecting member to permit a pivotal movement of the connecting member with respect to the yoke to align a selected one of the plurality of through holes of each first extension with a corresponding first hole of the yoke; and a pair of second connectors each extending through the corresponding first hole of the yoke and the selected one of the through holes of the first extension of the connecting member.

2. An adjusting device for a handle bar of a bicycle comprising:

a yoke having a first hole and a second hole; and a connecting member being adapted to receive the handle bar and securely connected with the yoke, the connecting member comprising:

a first extension having a plurality of through holes selectively corresponding to the first hole of the yoke;

a second extension having a through hole corresponding to the second hole of the yoke;

a first connector extending through the corresponding second hole of the yoke to permit a pivotal movement of the connecting member with respect to the yoke to align a selected one of the plurality of through holes of the first extension with the corresponding first hole of the yoke; and a second connector extending through the first hole of the yoke and the selected through hole of the first extension.

\* \* \* \* \*